US008698612B2

(12) United States Patent
Toll

(10) Patent No.: US 8,698,612 B2
(45) Date of Patent: Apr. 15, 2014

(54) APPARATUS AND METHOD FOR DEFINING A SAFETY ZONE USING A RADIATION SOURCE FOR A VEHICLE

(76) Inventor: Gordon Toll, Quebec (CA)

(*) Notice: Subject to any disclaimer, the term of this patent is extended or adjusted under 35 U.S.C. 154(b) by 124 days.

(21) Appl. No.: 13/143,158

(22) PCT Filed: Dec. 23, 2009

(86) PCT No.: PCT/CA2009/001870
§ 371 (c)(1),
(2), (4) Date: Sep. 21, 2011

(87) PCT Pub. No.: WO2010/075629
PCT Pub. Date: Jul. 8, 2010

(65) Prior Publication Data
US 2012/0025962 A1 Feb. 2, 2012

Related U.S. Application Data

(60) Provisional application No. 61/142,476, filed on Jan. 5, 2009.

(51) Int. Cl.
*G08B 21/00* (2006.01)

(52) U.S. Cl.
USPC .......................................... 340/468; 340/463

(58) Field of Classification Search
USPC .............. 340/425.5, 431–434, 463, 468–473, 340/945, 958, 981–983; 362/459
See application file for complete search history.

(56) References Cited

U.S. PATENT DOCUMENTS

| 5,497,304 A * | 3/1996 | Caine ........................... 362/485 |
| 5,825,305 A | 10/1998 | Biferno |
| 2009/0273941 A1 | 11/2009 | Englander |

FOREIGN PATENT DOCUMENTS

GB 2 260 437 A 4/1993

* cited by examiner

*Primary Examiner* — Jeffery Hofsass
(74) *Attorney, Agent, or Firm* — Saliwanchik, Lloyd & Eisenschenk

(57) ABSTRACT

An apparatus for defining a safety zone for a vehicle, the apparatus comprising one or more radiation sources operatively coupled to the vehicle, the one or more radiation sources configured to create one or more visible identifiers at one or more locations, said locations defining a pre-determined position relative to the vehicle, and said one or more visible identifiers thereby defining the safety zone for the vehicle. There is also disclosed, the use of one or more vehicle-mounted radiation sources to direct radiation to one or more pre-determined positions to create a conspicuous safety zone proximal to a vehicle. There is further described, a method for creating a safety zone proximal to a vehicle, comprising the steps of mounting one or more radiation sources on the vehicle; directing said one or more radiation sources towards one or more pre-determined positions proximal to the vehicle; and configuring the one or more radiation sources to create one or more conspicuous visible identifiers at the one or more pre-determined positions to define a safety zone for the vehicle.

22 Claims, 10 Drawing Sheets

510 500

APPARATUS AND METHOD FOR DEFINING A SAFETY ZONE USING A RADIATION SOURCE FOR A VEHICLE

CROSS REFERENCE TO A RELATED APPLICATION

This application is a National Stage Application of International Application Number PCT/CA2009/001870, filed Dec. 23, 2009; which claims the benefit of U.S. Provisional Application Ser. No. 61/142,476, filed Jan. 5, 2009; both of which are incorporated herein by reference in their entirety.

FIELD OF THE INVENTION

The present invention pertains to an apparatus and method for defining a safety zone for a vehicle.

BACKGROUND

Vehicles are increasingly being used by individuals and organizations for a wide variety of reasons. In addition to the increase in the number and types of vehicles being used, the number of shared spaces and travelways has also increased, both because of said increase in numbers and because travelways which were originally intended for certain types of vehicles are now being used by people and/or many different vehicle types. Further, people, animals and vehicles that share such spaces have many different attributes including conspicuousness, visibility to others, rate of travel, vantage point, profile, size and weight, to name a very few.

For example, an increasing number of vehicles, including bicycles, motorcycles, cars, trailers, strollers, trucks, buses, trolleys, and other vehicles are being used on roads or other spaces which were originally intended primarily for larger vehicles. As such, the risk of accidents has increased considerably.

In addition, this wide variety of different types of vehicles has also led to different risk factors. These factors include differences in speed, visibility to others, capability of seeing others because of different vantage points and/or fewer windows and mirrors, and difficulties for operators in judging the size of their own or other vehicles. The number of shared spaces in which vehicles are used has also increased. As well as roads and highways, waterways, airspace, recreational space, and many other spaces in which vehicles and people travel are typically experiencing a higher volume of traffic along with a greater variety of the types of vehicles being used.

There are many reasons that cause and exacerbate accidents, including, for example, the operator of a vehicle may not see another vehicle until it is too late to avoid the accident. Other reasons may result from the fact that some vehicles often present a much lower profile which is not able to be seen over features of larger vehicles or obstacles. In addition, there is often a significant difference in the rate of travel between different vehicles, people and animals that may exacerbate this problem. For example, a passing automobile may not have a chance to identify a cyclist until the last moment when it may be too late to take action to avoid a collision.

Another related cause of such accidents is the lack of adequate lighting systems on vehicles. In contrast to larger and more established modes of motorized transportation, many smaller vehicles, such as bicycles, strollers, bicycle trailers, and even some types of motorcycles, are sold with no or inadequate lighting equipment included. While the aftermarket provides many types of battery or generator powered lights for people, animals and vehicles, such lights often fail to be seen until too late and often do little to adequately indicate position or a safe distance from the person, vehicle, or animal that must be maintained. Light reflectors may also be used in lieu of such lights to indicate presence. Such reflectors, however, are dependent on the brightness of the light used by the approaching vehicle and the direction of travel thereof. In any event, such lights and reflectors have limited effectiveness during hours of daylight or in certain weather conditions.

Another problem resulting from the wide variety of vehicles being used on a wide variety of spaces, is that a safe distance between vehicles is often difficult to judge even when the presence and location of another vehicle is known. Operators of vehicles may simply not be aware of how close they may be to other persons or vehicles when they pass near them. Furthermore, it may often be difficult for a person to be aware of this space around their own vehicle if the vehicle itself, or a portion thereof, is not in their line of sight. For example, a bicycle or car on the opposite side of the corner of a building, or a golf cart on a green below a hill, will not be visible to others before they proceed around the corner or over the hill and/or direct other objects around the corner or over the hill (e.g., golf ball).

In many cases, there is a tendency for other vehicles and/or objects to be allowed to approach too close to another vehicle or person when passing nearby or otherwise entering the space thereof. This may result in an increase of anxiety for a person or operator of the vehicle, which may cause the operator to stop or change directions suddenly, or it may even result in contact with the vehicle. For example, some jurisdictions have enacted a '3 foot rule' intended to ensure that passing motorized vehicles do not come too close to a bicycle when they share the same road. Such laws indicate the need for providing space around vehicles.

While horizontally oriented flags from bicycles are known in the art and, which encourage drivers of vehicles to provide more space, they suffer from the same shortcomings identified above. In addition, they fail to be adaptable to different types of vehicles in different circumstances. For example, they typically only operate in a single direction (usually to the left-hand side of a bicycle) and are not intended to be moved between locations on the vehicle. They would also have little effect when used on larger vehicles, or ones that are farther away. In addition, when there is an obstacle for viewing the vehicle itself (i.e. other vehicles or features of landscape like hills or trees), the flag fails to indicate to others the presence or safe approach zone available. Furthermore, it does not resolve issues at night or in poor conditions of visibility.

Accordingly, there is a need for an apparatus and method for defining a safety zone of a vehicle.

This background information is provided to reveal information believed by the Applicant to be of possible relevance to the present invention. No admission is necessarily intended, nor should be construed, that any of the preceding information constitutes prior art against the present invention.

SUMMARY OF THE INVENTION

An object of the present invention is to provide an apparatus, use of an apparatus and method for defining a safety zone for a vehicle. In accordance with an aspect of the present invention, there is provided an apparatus for defining a safety zone for a vehicle, the apparatus comprising one or more radiation sources operatively coupled to the vehicle, the one or more radiation sources configured to create one or more visible identifiers at one or more locations, the locations defining a pre-determined position relative to the vehicle, and the one or more visible identifiers thereby defining the safety zone for the vehicle.

In accordance with another aspect of the present invention, there is provided a method for creating a safety zone proximal to a vehicle, comprising the steps of mounting one or more radiation sources on the vehicle; directing said one or more radiation sources towards one or more pre-determined positions proximal to the vehicle; and operating the one or more radiation sources to create one or more conspicuous visible identifications at the one or more pre-determined positions to define a safety zone for the vehicle.

In accordance with another aspect of the present invention, there is provided the use of one or more vehicle-mounted radiation sources directed to create one or more visible identifiers at pre-determined positions to create a safety zone proximal to a vehicle.

DETAILED DESCRIPTION OF THE INVENTION

Definitions

Figure 1:
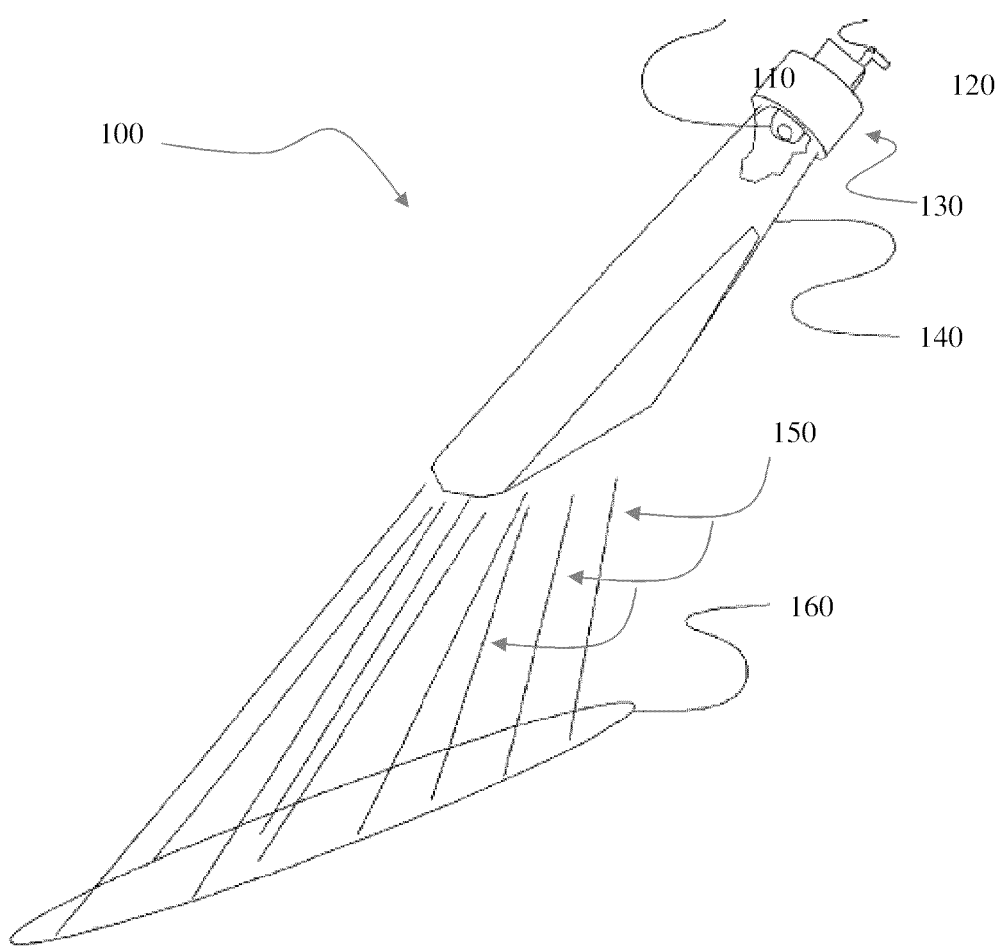
FIG. 1 depicts a device for defining a safety zone for a vehicle in accordance with an embodiment of the present invention.

The term "radiation source" as used herein, is defined to refer to a means for emitting electro-magnetic radiation. The electro-magnetic radiation emitted by the radiation source may be a wavelength, a range of wavelengths, or combination thereof of the electro-magnetic spectrum, for example, within the visible spectrum, infrared spectrum, ultraviolet spectrum, microwave spectrum, x-ray spectrum, and the like. A radiation source may be a natural or artificial source of ionizing and/or non-ionizing radiation, including LEDs and OLEDs, incandescent lights, fluorescent lights, and halogen lights, lasers, and the like.

The term "laser" is used to define light that is emitted in a narrow, low-divergent beam. While the term "laser" often refers to a highly coherent, low-divergent beam, with a narrow wavelength spectrum, the term may be used herein to refer to an electro-magnetic radiation source that is directed in a spatially coherent manner, such as a concentrated, narrow and focussed beam of light.

The term "scanner" refers to a beam deflector configuration, employing refractive, reflective, diffusive, or holographic means, capable of directing beams of electro-magnetic radiation as collimated-beams or convergent-beams that converge at one or more focal planes and is capable of directing one or more sources of electro-magnetic radiation towards a focal location such that a beam of radiation appears to be focused over a point, line, plane, region, area, volume or space. In some embodiments, the scanner may cause the beam to change directions faster than is discernible by the eye and, accordingly, appear to focus light from a single or a small number of beams of electro-magnetic radiation across a region or area on a plane that is greater in size than the one or more focal points of the single or small number of beams, or alternatively renders one or more static beams of radiation to provide one or more visible identifier that appear to be in motion relative to the vehicle. The term scanner can include polygonal scanners.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides an apparatus for defining a safety zone for a vehicle, the apparatus comprising one or more radiation sources operatively coupled to the vehicle, the one or more radiation sources configured to create one or more visible identifiers at one or more locations, said locations defining a pre-determined position relative to the vehicle, and said one or more visible identifiers thereby defining the safety zone for the vehicle. The visible identifiers are created by the one or more radiation sources by directing visible or non-visible radiation to or from a pre-determined position. In some embodiments, visible or non-visible radiation is directed from the radiation source to a pre-determined position to create a visible identifier at a pre-determined position. In other embodiments, the radiation source is located at the pre-determined position and emits visible radiation thereby creating the visible identifier.

In general, the apparatus provides one or more vehicle-mounted devices that direct radiation sources towards or from one or more locations proximal to or partially or fully around the periphery of a vehicle. In some embodiments, one or more radiation sources are used to create one or more visible identifiers, by emission of visible radiation, by reflection, refraction, or diffusion or other reaction of visible or non-visible radiation on or at a substrate or medium, the one more visible identifiers both attracting attention to the vehicle itself and defining a safety zone associated with the vehicle, wherein one or more edges of the zone can be defined by the visible identifiers.

In some embodiments, the safety zone is on one or multiple sides of the vehicle, including front, left, right, behind, above or below the vehicle as defined by the number, location, size and shape of the one or more visible identifiers. The safety zone in some embodiments, is defined by a number of visible identifiers, configured as points, lines, or two-dimensional shapes that are located in a region next to the vehicle. The safety zone therefore comprises in some embodiments the overall zone defined by (a) the outer edge of the shapes of one or more visible identifiers, and (b) in some cases the vehicle itself, for example when the safety zone is only defined by the visible identifier(s) on one or only some of the sides of the vehicle. In other cases, the safety zone can be defined by the one or more visible identifiers only, for example in circumstances when there is at least one visible identifier on all visible sides of the vehicle. The safety zone that is defined at least in part by the visible identifiers can encourage others to avoid entering that safety zone intentionally by, for example, stepping inside the safety zone, driving a car within the safety zone, or directing another object, like a golf ball, within the safety zone.

In some embodiments, the size, shape and/or location of the safety zone relative to the vehicle is pre-determined, for example, in accordance with certain requirements or conditions. The size, shape and/or location of the safety zone may be fixed relative to the vehicle for a given apparatus, or may be adjusted by the operator, according to existing conditions, or according to other criteria. Such adjustments may be made automatically, for instance according to a pre-existing control system associated with the apparatus, or manually by the operator of the vehicle or other person. Furthermore, in some embodiments the visible identifiers that define the safety zone can each be adjusted in terms of colour, brightness, size, shape and location relative to the vehicle. In some embodiments, the visible identifiers may not be adjusted.

In some embodiments, adjustments to the safety zone may be effected in a number of different ways. For example, such adjustments may occur by de-coupling one or more of the radiation sources and moving same to another location on the vehicle. Other examples of ways to adjust the safety zone may include adjusting the fixably movable coupling means to direct the radiation source in another direction, turning on and off of one or more radiation sources in a particular sequence, altering the direction of the beams of radiation emitted from one or more radiation sources in accordance with the means disclosed herein (e.g., scanner, beam splitter, beam collimator, beam reflector, etc.), or by other means designed to change the location, direction, or focus of a radiation source. Adjustments to the size and location of the safety zone and/or the pre-determined positions of the visible identifiers (as well as to one or more characteristics of the emitted radiation) can be effected according to instructions provided by the vehicle operator, in response to the prevalent conditions, a pre-determined control routine, instructions provided to a control module, which in some embodiments is configured to communicatively link the apparatus to a remotely located source of instructions or communication network (e.g., the Internet). For the pre-determined control routine, the instructions may be stored in a processing module associated with and communicatively linked with the apparatus. In some embodiments, the control module adjusts one or more pre-determined positions of the visible identifiers, characteristics of the emitted radiation or one or more visible identifiers, or a combination thereof. These adjustments may be made according to instructions stored on a computer readable medium contained in the control module, according to instructions provided by the operator of the vehicle, in response to changes in ambient conditions (which may be detected by one or more sensing devices communicatively linked to the control module), according to instructions received by the control module from a communications network, or any combination thereof.

In some embodiments, the control module may comprise of the any or all of following units, which may be operatively or communicatively coupled: one or more processor units, one or more memory units, one or more communications units, one or more sensor units, one or more motion units, or any combination thereof. The one or more processor units may be configured to process instructions, commands or other statements in order to carry out control and/or change in the various characteristics of the apparatus, one or more components thereof, one or more visible identifiers, or the emitted radiation. The instructions, commands or other statements that are processed by the processor may be stored in the one or more memory units. In some embodiments, the instructions, commands, or statements may be received by the one or more processor units as direct control signals from other systems or persons (such as, for example, the operator of the vehicle), as control signals received from one or more sensing units, and/or as control signals sent to the control module via a communications network via the one or more communications units. In some embodiments, a combination of such control signals may be used. In some embodiments, an algorithm may be stored on one or more memory units to provide instructions to one or more processor units, which can independently effect the control module to effect some change, or a combination of instructions, algorithms, or information stored on one or more memory units may be used in conjunction with other control signals. In one embodiment, information relating to, among other things, sensed proximity of another vehicle or object, sensed atmospheric conditions, control signals from voice recognition elements, or remotely communicated control signals may be used by statements, algorithms, or instructions stored on one or more memory to effect change in the apparatus or a characteristic thereof. The one or more processor units may be configured in some embodiments to send control signals to the one or more motion units to effect changes.

With reference to FIG. 1, an apparatus, generally referred to using the numeral 100 and in accordance with an embodiment of the present invention, comprises one or more radiation sources 110, a coupling means 120, a casing 130, an electrical connection, a levelling device (not shown), a processing module (not shown), an optical element 140 and is capable of forming a visible identifier 160, which in this embodiment is a reflection of visible light. The levelling device is located within the casing 130 and is configured to cut power to the radiation source 110 should the apparatus be tipped past a pre-determined angle from vertical. The processing module is configured to provide instructions for adjustment, and to effect said adjustment, of one or more characteristics of radiation emitted by the radiation source 110. The coupling means 120 provides for detachment from the vehicle such that this element of the apparatus can be removed from one location on the vehicle and attached to another. The optical elements, which are means for adjusting the characteristics of the beam 140, may comprise, for example, a beam splitter, beam reflector, scanner with motor, lens, mirror, or other optical element known in the art. Visible radiation emitted from the apparatus 100 may be configured as a coherent beam from the radiation source 110 which has been split into multiple beams 150, or alternatively, the multiple beams 150 may be a single beam that is being directed along multiple paths by a scanner such that the switch from one path to another may be faster than can be detected by the human eye and therefore appear to be multiple beams of light.

The resulting visible identifier 160 in this embodiment is a reflection of the laser radiation source 110. In some embodiments, due to the colour and class of laser 110, the visible identifier 160, or reflection, can be visible on a surface even in bright sunlight.

Visible Identifiers

In some embodiments, one or more radiation sources are used to create one or more visible identifiers that both attract attention to the vehicle itself and define a safety zone associated with the vehicle, the edges of the safety zone being defined by the visible identifiers. The visible identifiers in some embodiments comprise the radiation source and in other embodiments the visible identifier is a reflection and/or diffraction and/or reaction at the pre-determined position of the radiation emitted from the radiation source.

In some embodiments, radiation sources may be configured to create visible identifiers by way of reflection of visible radiation on a surface or other substrate proximal to the vehicle. In some embodiments, one or more of the radiation sources emit non-visible radiation that is capable of creating a visible identifier in the region around the vehicle, including by laser-induced breakdown of air beside, in front, behind, below or above the vehicle. In some embodiments, the radiation source is encased by a transparent or translucent medium through which the emitted radiation is reflected or diffused to create a visible identifier, such as bright coloured light. In some embodiments, the visible identifier is created by emission of visible radiation from the radiation source.

The one or more radiation sources may also, in some embodiments, create the visible identifiers by way of a reflection on, a reaction in, or otherwise altered state of a medium or substrate proximal to the vehicle. This may include a reflection of visible radiation on the surface that the vehicle is on, a laser-induced breakdown of air or other fluid or solid at a pre-determined position relative to the vehicle, light interference at a pre-determined position relative to the vehicle, or other visible change or reaction to a medium or substrate located at a pre-determined position relative to the vehicle caused by visible or non-visible radiation emitted from the one or more radiation sources. In an exemplary embodiment, the one or more radiation sources can be located at one or more pre-determined positions wherein the emitted radiation is diffused or used to brighten (i.e. shone through) a transparent, semi-transparent, translucent or semi-translucent substrate or medium that is proximal or surrounding one or more radiation sources. In addition, according to embodiments, laser-induced breakdown can refer to a high-energy laser pulse which is focused into a gas, which may cause ionization of the gas resulting in an associated bright light. In some cases, a laser pulse may also ablate solid material into the gas phase, which in turn is ionized. The energy of the laser-created plasma can atomize, excite, and ionize gaseous, liquid or solid material. A laser-induced breakdown is associated with light emanating from the location of the breakdown.

In general, the location of a visible identifier is a pre-determined position relative to the vehicle. The location may be relatively close to or relatively far away from the vehicle. A relatively far away location may be used to indicate the position of and create a larger safety zone for a vehicle that is suitable with respect to other vehicles or persons which may be a large distance away therefrom, or for which a direct line of sight between the vehicle and another vehicle or person is not possible or is inadequate. The pre-determined position may be on a surface upon which the vehicle is travelling or in the space surrounding the vehicle, for example above, below, in front, behind, or beside the vehicle. An example of such an embodiment may include a boat having a visible identifier located 10 to 15 meters above it so as to indicate the position and safety zone to water-, air- or land-based vehicles or persons which may be relatively far away. Another example would be a golf cart having a visible identifier located a number of meters above the vehicle so as to warn other golfers of the presence of the vehicle, as well as indicating a safety zone into which golf balls should not be struck, even when said other golfers' view of the golf cart or associated golfer is obscured by a hill, tree or other feature. A further example could include a helicopter or other flying vehicle having a visible identifier projected below, either as a reflection on the ground or other visible identifier, in order to provide visible identification of the vehicle above and a safety zone that should not be entered by a person, vehicle or object below the vehicle. A further example would be a bicycle having multiple visible identifiers located on one or more sides of the bicycle which indicate the presence of the bicycle to cars and other vehicles sharing the same road and/or to indicate a minimum safety zone that should not be entered when passing within the proximity of the bicycle.

The visible identifiers are, in some embodiments directed towards the surface around the periphery of the vehicle in order to create a visible identifier for the vehicle. In other embodiments, the radiation sources are directed towards a space around the vehicle to create one or more visible identifiers in the space around the periphery of the vehicle. This can increase the conspicuousness of the vehicle, such that the vehicle and its periphery may be more noticeable to the operator of the vehicle, as well as to others. In addition, the one or more visible identifiers create the appearance of a region around the vehicle that can encourage other vehicles to provide more space than if the region is not defined, since they will remain outside the conspicuous safety zone. The one or more radiation sources may be directed toward the space around the vehicle by an extender or other extension means that are secured at one portion to the vehicle and extend outwards therefrom and are secured at another portion to one or more radiation sources. The radiation sources can direct radiation to or through a reflecting or diffusing media to form the visible identifier or the radiation source itself can comprise the visible identifier by emission of visible radiation, and some embodiments may comprise a combination of such configurations.

According to some embodiments of the present invention, the radiation sources are generally directed to create a visible identifier in a pre-determined position. The location is generally a pre-determined distance from the vehicle and the visible identifier is typically substantially independent of radiation sources located on the vehicle used on the vehicle for other purposes (e.g. headlights, taillights, under-car cosmetic lighting). As such, there is typically a discrete visible identifier in a known and desired location, which may be in a fixed (or apparently fixed) location, or within in a fixed region, relative to the vehicle. Furthermore, the distance from the vehicle may also be pre-determined. The overall shape of the safety zone is defined at least in part by the relative position of the one or more visible identifiers and the vehicle.

According to some embodiments of the present invention, the geometry of each of the one or more visible identifiers may be pre-determined. The shape of the one or more visible identifiers may include a point, line, surface or volume on a proximal surface or space. The shape or geometry of a visible identifier may also refer in some cases to the overall shape of the safety zone as a whole. For example, the geometry of the visible identifier may be defined by a number of discrete points along one or more sides of the vehicle formed on a road surface. In other embodiments, the pre-determined geometry includes the shape of the safety zone around the vehicle formed by lines, areas defined by one or more shapes and/or points, or combinations thereof, along one or more sides of the vehicle, including multiple points formed by the radiation sources when extended from the vehicle along or by one or more extenders or extension means.

The shape or geometry of the visible identifiers may appear as one or more pre-defined shapes on a surface around one or more sides of the vehicle, such as filled-in area or a region on one or more sides of the vehicle. In some embodiments, such a pre-defined shape may be caused by one or more radiation sources. In embodiments of the present invention, the shapes of the visible identifiers may be enabled by blocking parts of the beam or beams of radiation, or may be caused by a number of radiation sources used in conjunction with one another. In some embodiments, the shapes of the visible identifiers may be caused by rapid beam deflection, such that the speed of the beam deflection is faster than may be detected by the human eye, therefore allowing one or more radiation sources to create a reflection or other type of visible identifier that appears as a line, surface or volume. In some embodiments, the movement of the one or more visible identifiers may be discernable within a line, surface or volume.

Figure 2:
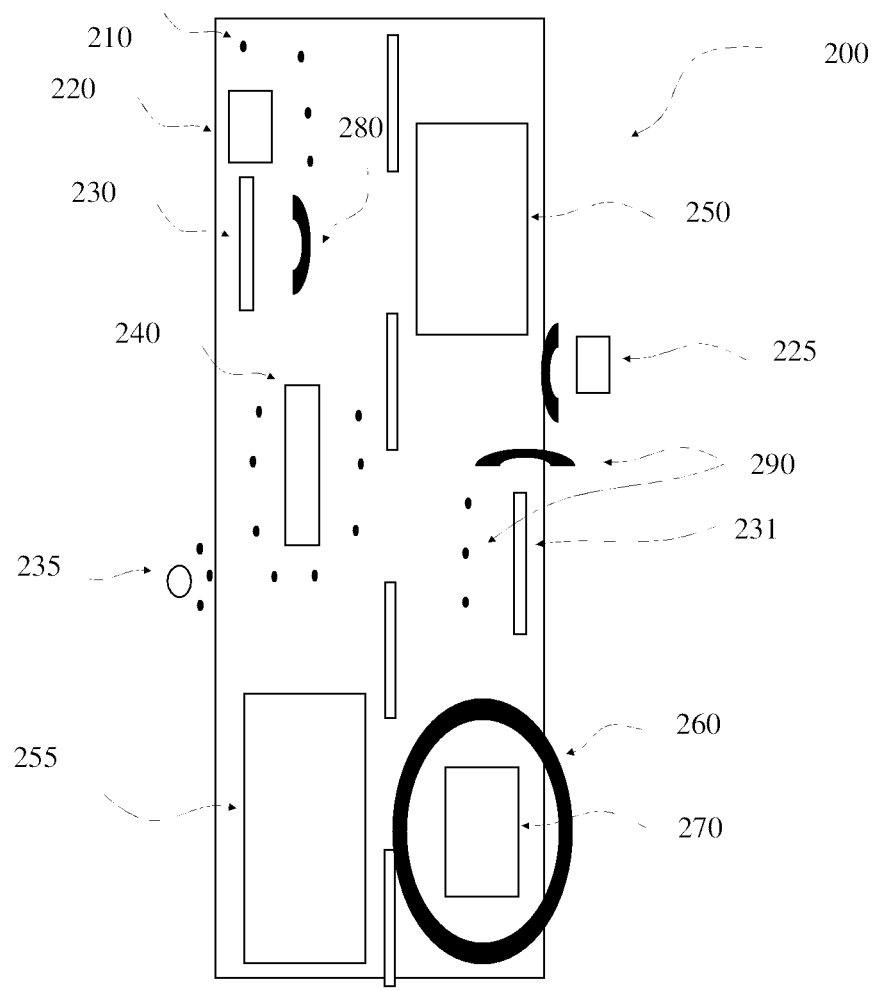
FIG. 2 depicts a number of exemplary visible identifiers shown as shapes around or in the proximity of a variety of vehicles and persons, which are generated according to embodiments of the present invention.

FIG. 2 shows a number of possible variants and/or embodiments of visible identifiers as they may typically be associated with some common land-based or road vehicles according to embodiments of the present invention. The environment in which the embodiments of the visible identifiers shown in FIG. 2 are operating 200 is a road shared by a number of land-based vehicles. Some of the vehicles are using an embodiment of the instant invention to define a safety zone, including bicycles 230, 231, a bicycle trailer 220, a motorcycle 240, a car 270, a truck 250, 255, a stroller 225, and a person 235. The visible identifiers may be characterized as "points" 210, areas or regions 260, 280, or as combinations thereof 290.

Radiation Source

The one or more radiation sources comprise elements that output either visible radiation or non-visible radiation, or both. For instance, some embodiments will employ a radiation source that emits light, whereas others will utilize the energy available in radiation to induce light or other visible effect in another medium. In instances where the radiation is visible light, the visible identifier can be characterized as a reflection from a proximal medium, such as the surface upon which a vehicle may be located (e.g., a road, wall, water surface, or suspended particles like water or dust droplets) or media secured to the vehicle, apparatus or one or more radiation sources. The radiation source may also form the visible radiation source in some embodiments. In other embodiments, the emitted radiation may be diffused or reflected on one or more media to create the visible identifier. In cases where the radiation is non-visible, the radiation may be used, for example, to create a visible identifier at the pre-determined position by utilizing the energy of the emitted radiation. In such cases, the emitted radiation can induce a breakdown of material thereby inducing some change in the properties of the medium that is located at the focal point or plane of the directed radiation. These changes in properties include ionization, change in density (thereby affecting the speed of incident light therethrough), chemical or other reaction, and resonant radiation. Each of said changes in properties is associated with a noticeable visual effect.

In embodiments employing a visible radiation source, widely used visible radiation sources may be used as the radiation source and/or visible identifier. These radiation sources, which may be a device used for creation of light, including incandescent and fluorescent lamps, lasers, and photoluminescent, chemoluminescent, and fluorescent and phosphorescent radiation sources. Other common lighting devices include light emitting diodes (LED) and organic LEDs (OLED). Such radiation sources may generally include a electrical device capable of emitting light. In some embodiments, the visible identifier may comprise the radiation source located along proximal edges of a vehicle or on the proximal end of one or more extensions extending from one or more locations on the vehicle.

In some embodiments, the one or more radiation sources are directed away from the vehicle to create a visible identifier by placing the one or more radiation sources at a proximal end of an extension means extending from the vehicle. The radiation sources can be located at a pre-determined position relative to the vehicle when the extension means is capable of being manipulated and fixed into a particular configuration such that the radiation source and, in some embodiments, the visible identifier, at the end of the extension is at a pre-determined position. The extension means can in some embodiments be semi-rigid, non-flexible, fixably flexible, and/or extendable or fixably extendable.

In some embodiments, lasers are a category of lighting devices which may be used as a radiation source. Lasers produce a coherent light that are well-suited for producing a highly visible beam or reflection of light, or other visible identifier. The reflection of light from a laser may permit visibility of a visible identifier in numerous conditions, including reflection from a road surface in bright sunlight. The general category of lasers includes but is not limited to gas lasers (e.g. helium-neon laser, carbon-dioxide laser), chemical lasers, metal-vapour lasers, exciter lasers, solid-state lasers (e.g. ruby laser, neodymium laser, titanium-doped sapphire, YAG and doped YAG lasers), fibre lasers (e.g. erbium-doped fibre lasers), dye lasers, free-electron lasers and semiconductor lasers. These lasers differ widely in their power levels, efficiency, size, stability and wavelength ranges.

Some commonly used lasers that may be used in some embodiments as the radiation source include gas lasers, chemical lasers, gas lasers, solid state lasers, semiconductor lasers, fiber hosted lasers, photonic lasers, dye lasers, and free electron lasers. Some solid state lasers which may be used to produce a laser-induced breakdown of air include YAG lasers and doped YAG lasers, such as Nd:YAG Er:YAG, Yb:YAG and Ho:YAG. Other solid state lasers include Yb:KGW, Yb:KYW, Yb:SYS, Yb:BOYS, Yb:CaF$_2$, ND:YVO$_4$, Nd:YLF, Ti:Sapphire. A person skilled in the art would understand that these types lasers are examples of lasers that, under the appropriate settings as would be known to a person skilled in the art, could be used to create visible identifiers.

Semiconductor lasers, which are manufactured on a semiconductor medium, are available in a wide range of sizes and classes, and predominantly fall into two categories. Edge-emitting diode lasers have a horizontal cavity with its principal axis parallel to the plane of the semiconductor wafer/chip, and vertical end mirrors perpendicular to the plane of the semiconductor wafer/chip. Vertical cavity surface emitting lasers have a vertical cavity with its principal axis perpendicular to the plane of the semiconductor wafer/chip and horizontal mirrors parallel to the plane of the semiconductor wafer/chip.

Many visible radiation sources have beam spread, and therefore the visible radiation source may incorporate collimating elements, such as are readily known to a worker skilled in the art, to achieve a narrower beam width, thereby increasing coherence and resulting visibility and/or brightness of a visible identifier. For example, semiconductor lasers typically have elliptical beam spreads of roughly 30 degrees by 10 degrees. As the radiation is coherent, these beams can be collimated into a beam with much less divergence, such as is done for handheld laser pointers. Examples of collimating elements include but are not limited to spherical lenses, cylindrical lenses or the like.

While the term "LASER" originated from an acronym which stands for Light Amplification by Stimulated Emission of Radiation and was originally associated only with light created by stimulated emission, a person skilled in the art of radiation sources would readily understand that the term encompasses radiation sources capable of producing light that is spatially coherent, which means that the light either is emitted in a narrow, low-divergence beam, or can be converted into one with the help of optical components such as lenses. Typically, lasers are thought of as emitting light with a narrow wavelength spectrum ("monochromatic" light). However, some lasers may emit light with a broad spectrum, while others emit light at multiple distinct wavelengths simultaneously. The coherence of typical laser emission is distinctive. Most other radiation sources emit incoherent light, which has a phase that varies randomly with time and position. Lasers, as described in this application, can produce an intense, directional beam of light.

Lasers have been classified by wavelength and maximum output power into the four classes defined above, as well as additional subclasses since the early 1970s. The classifications categorize lasers according to their ability to produce damage when exposed to people. For example, under IEC 60825-1 classification scheme, class 1 lasers provide no hazard under all conditions of normal use while class 4 lasers can burn the skin, and produce permanent eye damage as a result of direct or diffuse beam viewing. A worker skilled in the art will readily be able to choose an appropriate laser source to be used in or for a visible identifier that would be suitable for a given application or condition (e.g., low visibility, high or low light, large distances between approaching vehicles), based on any one or more of the accepted classification schemes, for example, IEC 60825-1, ANSI 2136.1, or IEC 825.

In some embodiments, desired color for visible identifiers may be obtained by mixing various colors. For example, red, green and blue light from independent radiation sources may be combined to obtain white light having a variety of colour temperatures or other colour of light based on the colour gamut defined by the respective colours combined. Alternately, a single common radiation source may be used with wavelength-conversion elements to generate the plurality of colors that can be mixed to create white light. Various techniques for efficient color mixing are readily known to a worker skilled in the art. For example, the mixing means may be controlled to obtain a desired chromaticity.

As a person skilled in the art of lasers would realize, certain colours and certain classes of lasers will dissipate over distance and may be more or less discernable as reflected light on various surfaces, depending on certain extraneous conditions or factors, including ambient light, particulate matter, and the reflectivity and smoothness of a surface. Accordingly, in order to ensure that the desired effect of the laser is achieved during certain times of the day, in different weather or air conditions, and on a wide variety of surfaces and/or substrates, different colours or classes of laser may be necessary. In some embodiments, the apparatus may comprise lasers of such colours and classes such that the device will operate as desired in all conditions and at all times. In other embodiments, a specific colour or class will be used that is configured for use in all such conditions that may be expected.

The radiation source may be designed to ensure compatibility with desired criteria. These criteria may include, but are not limited to, the spatial and frequency distributions of the luminous intensity generated by the radiation source.

In some embodiments, a laser can be used to induce breakdown of a medium, such as air or water, thereby causing the formation of plasma. The plasma formed by such breakdown may be one or more small pinpoints of plasma at a pre-determined position relative to the vehicle. In some embodiments, the plasma may also by formed in geometric shapes, such as a ball, sphere, or polyhedra. As an example, a 200 mJ YAG laser at 1064 nm can cause air to breakdown in one or more beam focus locations at 20 times per second thereby causing one or more pin-points, or other geometrical shapes comprising plasma (ionized gas) at one or more pre-determined positions around the vehicle. Depending on the settings of the one or more radiation sources and the one or more pre-determined positions, the one or more pin-points or other geometrical shapes can form other geometrical shapes. As the one or more pre-determined positions may be, in some embodiments, in the space around the vehicle, the one or more visible identifiers may appear to be "suspended in mid-air". In other embodiments, the visible identifiers may appear to be on the surface upon which the vehicle is travelling.

A worker skilled in the art will readily understand the various criteria for radiation sources. For example, provincial or federal or other levels of government may have regulations regarding the color, power and/or spatial distribution of the radiation source that can be used. Such regulations, if any, may take into account various factors including but not limited to: visibility in various weather conditions (e.g. fog, mist); potential damage to human tissue (e.g. retina). For example, the radiation source may be installed on the vehicle at a low height to ensure that in foggy conditions, the reflected glare is minimized for the driver of the vehicle as well as other drivers on the road. In one embodiment, the color of light is yellow, blue or green for improved visibility in fog.

Optical Elements

In some embodiments, optical elements may be used to alter the characteristics of a radiation source. For example, one or more optical elements may enable a common radiation source to create multiple visible identifiers or different shapes/geometries of one or more visible identifiers. They may also be used to make certain visible identifiers more or less bright, be in motion relative to the vehicle, change focal location or plane, or colour, temperature, among other characteristics that would be known to a worker skilled in the art. Optical elements may use various different diffractive, reflective, refractive, or holographic properties to affect characteristics of emitted radiation. In some embodiments, the optical element may be close to the radiation source or separated therefrom.

In some embodiments, optical elements may include for example, beam splitters, beam combiners, beam reflectors, and collimators. A beam splitter refers to any optical device that splits a beam of light into two. A beam splitter when used in reverse acts as a beam combiner. A beam reflector operates to direct a single beam into a plurality of locations. A beam reflector may also direct a single beam to a series of locations in succession. The beam reflector may direct beams across multiple locations continuously, or move across multiple locations, such that the movement from and to any given location and/or residence in any location are too fast to be discernable. Such an effect would allow a single radiation source to appear to create multiple visible identifiers simultaneously, or to create a relatively large visible identifier characterizable as an area, region or space by using single point from a single beam. A worker skilled in the art will readily understand that beam splitters can be designed to obtain varying splitting ratios. A worker skilled in the art will readily understand that the design of beam splitters and beam combiners can at least in part depend on the wavelength of the light.

The various optical elements associated with the radiation source of some embodiments may be designed to achieve a desired spatial luminous intensity distribution. A worker skilled in the art will readily understand that the spatial luminous intensity distribution is affected by the geometric shape and spatial arrangement of the optical elements of the radiation source. For example, the optical elements may use a diffuse, specular, or semi-specular reflector, using appropriate materials known in the art, (e.g. spun, peened, anodized or electroplated metal, sputtered plastic or glass etc.), to obtain a desired luminous intensity distribution. The optical elements may be designed for light processing functions such as filtering, mixing, spatial manipulation, control of polarization or intensity, or colour etc.

In one embodiment, the optical elements comprise one or more optical filters that block undesired wavelengths from being output from the radiation source. For example, the wavelength range of the output light may be controlled to ensure that a user does not suffer retinal damage. In one embodiment, the radiation sources utilize a filter to block any UV light and to allow substantially only the visible light to be outputted therefrom. In other embodiments, visible wavelengths of radiation may be filtered; for example in cases where the radiation is intended to create the visible identifier by other means than the visible emission, reflection or diffusion of the radiation itself (e.g., laser-induced breakdown of air), fluorescence or phosphorescence.

In some embodiments, the optical elements receive radiation from a radiation source and may deliver one or more wavelengths therefrom. The optical elements can comprise a means for isolating one or more wavelengths and emitter optics that orient and focus the wavelength(s). The optical elements may be controlled by a control module and/or processing means, wherein the control module may be a processor or a microprocessor configured to perform functions comprising, for example, pulse coding and pulse shaping, thereby enabling the modulation of the emitted radiation.

In order that electro-magnetic radiation which is emitted from the radiation source can be distinguished from ambient light, the optical elements may adjust, filter, or otherwise enhance any characteristics of the emitted radiation.

In one embodiment, a generic device for the generation of the emitted radiation may require the ability to vary the spectral characteristics of emitted radiation. This can be accomplished by using wavelength separation optical elements to filter the emitted light thereby isolating narrow portions of the wavelength spectrum.

In some embodiments, the optical elements may comprise a processing means that further comprises a light control device that provides a means for modulating the light. A control device can be an indirect modulator, for example, a chopper, shutter, liquid crystal filter, galvanometric scanner or acousto-optic device. In addition, modulation of electromagnetic radiation can be performed in a direct manner using an amplitude modulator circuit or a frequency modulator circuit. A worker skilled in the art would understand alternate methods of modulating the emitted radiation.

In some embodiments, optical elements may include lenses, fresnel lenses, compound lenses, filters, mirrors, prisms, waveguides, collectors, compound collectors, refractive concentrators, reflective concentrators, optically coated media and/or means for diffracting, reflecting, diffusing, dispersing, polarizing, and scattering. Such optical elements may be refractive elements, including lenses, reflective elements, including mirrors, or hybrids thereof. Other optical elements may include luminescent collectors and/or concentrators capable of absorbing incident photons, and emitting the same or new photons, which may in turn be guided by internal reflection towards a common direction. The optical element(s) may comprise waveguides in some embodiments. Waveguides may be characterized as structures that guide electromagnetic waves by virtue of their internal reflective properties (e.g., fiber optics). Waveguides may be classified according to their geometry (planar, strip, or fiber waveguides), refractive index distribution (step or gradient index) and material (glass, polymer, semiconductor). The optical elements in some embodiments include holographic optical elements capable of introducing interference or diffraction in multiple beams of radiation, thereby causing patterns of varying intensity.

In some embodiments, optical elements may also be characterized by their shape. The shape of various optical elements, such as lenses or mirrors, are configured to alter the characteristics of emitted radiation. The characteristics include, but are not limited to coherence, focal point/plane, direction, beam spread, and other characteristics as would be understood by a worker skilled in the art. The shapes include parabolic, hyperbolic (or "trumpet"), elliptical, tubular, triangular, compound parabolic, compound hyperbolic, compound elliptical. In some embodiments, the use of different materials in the optical elements may alter the characteristics of emitted radiation. For example, different materials may increase or decrease the capability of using total internal reflection to direct radiation. Different materials may also affect certain wavelengths and not others, and/or intensity thereof.

Levelling Device

Some embodiments comprise a levelling device. In general, a levelling device includes one or more devices whose purpose is to direct a radiation source towards the pre-determined position, despite a change in the orientation of the radiation source (as caused by, for instance, a change in orientation of the vehicle upon which the radiation source is mounted or by a failure of the coupling element, among other reasons). The levelling device may also include one or more devices whose purpose is to permit operation of a radiation source when the orientation of the radiation source is within pre-determined limits, and prohibit or alter operation of the radiation source when it is not (e.g., cut-off power to the light or use a filter or lens to block harmful radiation when the radiation source is not pointing more or less downwards).

In some embodiments, the levelling device may include a device that is intended to cease the operation of the radiation source when it is directed away from the pre-determined position, for example, levelling switches, or cut-off switches, may be used to turn off the radiation source when not required, to conserve electricity or to avoid glare to others. In one embodiment, the vehicle is a bike or a motor bike, and the radiation source may be turned off or altered when the vehicle tilts vertically (for example, when the driver of the bike makes a turn), to ensure that the light beam does not cause difficulties for others near the vehicle. The angle of tilt at which the radiation source is turned off may be easily determined by a worker skilled in the art, and may depend on the position of the radiation source on the vehicle.

In some embodiments, the levelling device may include a means to ensure that the radiation source output is substantially always directed towards the pre-determined position (e.g., nearby surface of the road or ground) or other pre-determined position (e.g., the vertical column above the vehicle). For example, the levelling device may include a pivotal attachment which allows the radiation output to always point downward on the surface of travel irrespective of the tilt angle. Appropriate designs for such coupling elements would be readily known to a worker skilled in the art. These cut-off switches and/or levelling device may be controlled either manually or automatically. In some embodiments, levelling devices may comprise any or all of the functionalities discussed herein.

In some embodiments, the levelling device may include one or more optical elements to alter the characteristics of the radiation that is emitted by the radiation source. For example, a filter, lens, mirror, reflector, defractor, or other optical element that would be known to a person skilled in the art may be positioned and/or mounted such that when a beam of radiation is directed away from the pre-determined position, the beam of radiation is blocked, altered, or directed in a different direction.

In other embodiments, the levelling device for the radiation source allows the vehicle operator to adjust the beam pattern or direction. A levelling switch may be located within the driver's reach and controls levelling motors operatively associated with the radiation source. The levelling switch may have a plurality of settings.

Coupling Element and Casing

In general, the one or more radiation sources are secured to a vehicle in order to direct the radiation sources such that visible identifier is located around the periphery of the vehicle, including when the radiation source is located on an extender such that the radiation sources are at one or more pre-determined positions that define a safety zone. The radiation source coupling may include both a coupling element and a casing. The coupling element may comprise both a vehicle securing means and/or a radiation source securing means, such as a clamp. In some embodiments, the coupling element has a plurality of locations configured to receive a corresponding one of the plurality of radiation sources, scanner devices, batteries, levelling switches, extenders or extension means, or other element disclosed herein. The radiation sources and/or coupling element and/or extension means are independently capable of being moved and fixed at different angles so that the radiation sources can be directed in any fixed direction.

The coupling for the radiation sources may comprise a casing to contain some or all of the components, including the plurality of radiation sources, scanner devices, power devices, levelling switches, or other control module. The casing can provide a protective cover from the external environment but also provide a way to direct the apparatus in the desired direction. It also provides, in some embodiments, a convenient way to move the apparatus or components thereof to different locations of the vehicle.

The coupling element may also include a vehicle attachment means, such as a clamp or a mounting plate. The vehicle attachment means are attachable to any surface or feature of the vehicle, provided there is a line of sight between the radiation source and the periphery of the vehicle.

The apparatus is generally mounted on the vehicle in such a location so that the visible identifier is substantially coextensive relative to the periphery of the vehicle. Installation of the apparatus may require one or more screws or bolts or clamps, and the apparatus may be mounted on several different types of vehicles and in different locations of any such vehicle. Placement of the apparatus may in some embodiments be as low as possible to prevent the vision of another driver being impaired by beams of light. In some embodiments, the apparatus can be mounted to a vehicle from about 6 inches to about 43 inches above the ground. The apparatus at or near this height range can provide an optimum mounting height so that the visible identifier may range the entire length or width of the periphery of the vehicle, as the case may be.

The coupling element may also provide in some embodiments a means to direct the associated one or more radiation sources. This can be done automatically by a control module to carry out a pre-determined pattern or motion or change the characteristics of the emitted radiation. Such control module may include both the physical elements to change the direction and alter the characteristics, as well as the means to determine when and how to make such adjustments, such as a processing module with information stored thereon to operate the one or more radiation sources according to an algorithm or in response to signals from the operator of the vehicle or otherwise from the environment. For example, the operator may set a pre-determined routine for motion, brightness, colour and operation of the sources, or it may react to instruction from the operator to induce one or more one-time adjustments. In some embodiments, the control module may detect changes in prevailing conditions, such as ambient sunlight, fog, temperature, rain, incline of the vehicle or the radiation sources, and adjust the characteristics of one or more radiation sources. The characteristics may include brightness, colour, power, sources, motion, location, size and shape of the visible identifiers, as well as which particular sources of operation and other characteristics discussed herein or would be known to a person skilled in the art.

The Control

In some embodiments, the one or more radiation sources may be part of, or contiguous with, the casing or coupling element. In other embodiments, the one or more radiation sources may be secured directly on the casing or coupling element. In yet other embodiments, the one or more radiation sources may be operatively connected to a proximal portion of an extension means, the extension means being fixed and operatively connected at another portion to the casing or coupling element. In any of such embodiments, the one or more pre-determined positions of the visible identifiers may coincide with the locations of the radiation sources, in another location, or a combination thereof.

Scanners

In some embodiments, a scanner may be used to create a number of different geometric shapes on proximal surfaces and/or moving locations of a visible identifier. A polygonal scanner, for example, provides for a high number of rapidly moving mirrors that change the path of light, which may be fixed relative to the vehicle, so that the location of the visible identifier appears to be moving, or it appears to comprise a filled-in area, space or volume, or combination thereof. This motion and/or apparent shape can increase the conspicuousness of a vehicle, increase the size of the safety zone, or provide for different safety zones at different times. Different safety zones may be desired, for example, in differing traffic, road, or weather conditions or depending on the vehicle type, or combination thereof.

A wide range of standard and custom scanners are known in the prior art that are used in the laser industry for printing and marking, scanning, inspection and measurement, and image projection. The rotating polygonal mirror deflects a beam along a line and in the process transforms the beam from a static source of light into a moving radiation source (for example, in laser illumination devices). In the reverse case, a static sensor can be used to scan along a line.

In some embodiments, scanners comprise of a mirror portion, a bearing portion, and a drive portion. The mirror portion further comprises a number of mirror facets mounted on the rotatable bearing portion. The mirror portion can be characterized according to the facet dimensions (length, width), number of facets, circumference, facet flatness, facet roughness, reflectivity, and reflection variation. The bearing portion is a physical support upon which the mirror portion and its facets are mounted. The bearing portion is capable of rotating about one or more axes. The drive portion is configured to provide motive power to rotate the bearing portion about the one or more axes.

In some embodiments, bearing portions can be manufactured from brass, nickel, and copper, and aluminum, or other materials suitable for scanner bearings as would be understood by a person skilled in the art. Some scanners may require heat resistance, depending on the laser type and different materials may provide differing results in this regard. In addition, surface coatings may be applied for a number of reasons, including but not limited to, enhancing or reducing reflection in some or all facets for some or all wavelengths of radiation, altering wavelength, or increasing heat resistance. Polygonal scanners can be designed for use in various optical spectrums, including the visible and infrared regions.

Energy Generation

The energy required for operating the one or more radiation sources and the optionally included scanner(s) and their respective motor(s), control mean(s), or other powered element(s) discussed herein, may be provided in a number of ways. In one embodiment, a battery is included as a component of the apparatus. In another embodiment, energy is supplied from a battery or power generation device that is already situated on the vehicle, such as, but not limited to, a motorcycle battery or alternator. In another embodiment, the apparatus includes an energy generation device that may be attached to a moving part of the vehicle.

Some embodiments comprise generators that use spinning wheels or other elements, such as hub generators, sidewall generators and drum generators. Hub generators are typically part of, or located near the axle of a wheel, and while are much less prone to physical jarring, contamination, and interference from extraneous factors (e.g. slippery tires), they tend to produce less power due to their relatively low speed due to close proximity to the axis of rotation. Sidewall generators typically provide a rotatable means that can be pressed against the side of a wheel, tire, or other moving part, which provides a generator rotation. Drum generators are similar to sidewall generators except they are located in the plane of rotation. Both sidewall and drum generators may be prone to interference, contamination or physical jarring.

In some embodiments, combination of batteries, solar generation, internal combustion engines, motors, generators, alternators, wind generation, fuel cells, or some other combination of power generation may be used to generate power for the apparatus, including for the radiation sources, scanners, beam splitters/reflectors, and any other control devices. In some embodiments, batteries may be used to power the apparatus or elements thereof, and another source of power may be used to charge the battery. In general, a source of power capable of empowering the radiation sources (and other elements of the apparatus, as would be necessary) that would be known to a person skilled in the art would be suitable for this purpose.

Use on Vehicles and Types of Vehicles

In general, the apparatus may be used on substantially any type of vehicle, including bicycle, motorcycle, car, truck, stroller, golf cart, boat, plane, helicopter, or trailer, or sidecar for said bicycle, motorcycle, car, truck, stroller, or golf cart. It is also anticipated that the apparatus may define a safety zone around a person and therefore, a vehicle may include a person or an animal. In many cases, people or animals will share the same spaces as other vehicles and a safety zone around the body may be required. In general, something in motion, a manned or unmanned vehicle, a person, or an animal may use the apparatus or method in order to create a safety zone therearound.

The safety zone may be used to discourage others from entering, or from causing something to enter, the proximal space of a vehicle, but in some cases the safety zone may provide an indication for the operator of the vehicle the extremities of the vehicle. For example, it may be difficult for a truck driver to see how far the front or the rear of a truck may extend from the driving position, but with use of some embodiments of an apparatus for defining a safety zone (and possibly using the mirrors that are used in the normal operation of a truck), the driver may have a better indication of how far such extremities may extend.

Another embodiment is the use of one or more vehicle-mounted radiation sources to direct radiation to one or more pre-determined positions to create a conspicuous safety zone proximal to a vehicle. Said use may also comprise use of said radiation sources in combination with one or more of the related elements and purposes discussed above. Furthermore, the use may be associated with the vehicle in a location (i.e., road, airspace, water, recreational spaces, etc.) as discussed above or would be understood to a person skilled in the art.

A further embodiment is a method for creating a safety zone proximal to a vehicle, comprising the steps of mounting one or more radiation sources on the vehicle; directing said one or more radiation sources towards one or more pre-determined positions proximal to the vehicle; and the one or more radiation sources being configured to create one or more conspicuous visible identifiers at the one or more pre-determined positions to define a safety zone for the vehicle. The method may further incorporate any of the functions, elements, purposes, or variants thereof, discussed above.

Figure 8:
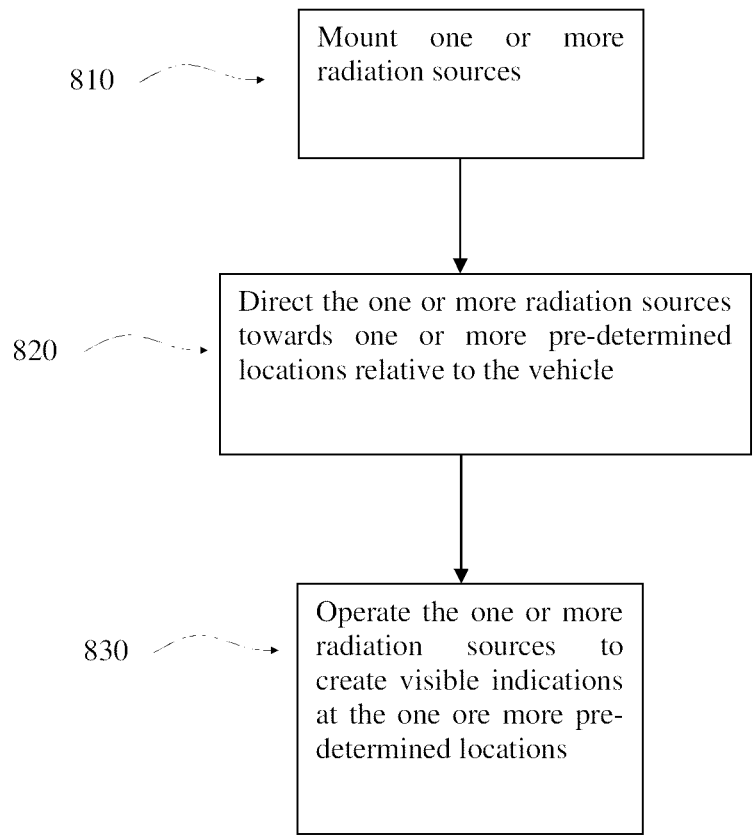
FIG. 8 depicts the steps of a method of defining a safety zone for a vehicle or person in accordance with one embodiment of the present application.

FIG. 8 illustrates a method for creating a safety zone for a vehicle in accordance with one embodiment, comprising the steps of mounting one or more radiation sources 810 to a vehicle such as a car, bicycle, stroller or truck; followed by the step of directing the one or more radiation sources towards a pre-determined position relative to the vehicle 820; and then operating the one or more radiation sources in order to create one or more visible indications at the one or more pre-determined positions in order to define a safety zone 830.

EXAMPLES

The invention will now be described with reference to specific examples. It will be understood that the following examples are intended to describe embodiments of the invention and are not intended to limit the invention in any way.

Example 1

Visible Radiation Source with Polygonal Scanner

Figure 3:
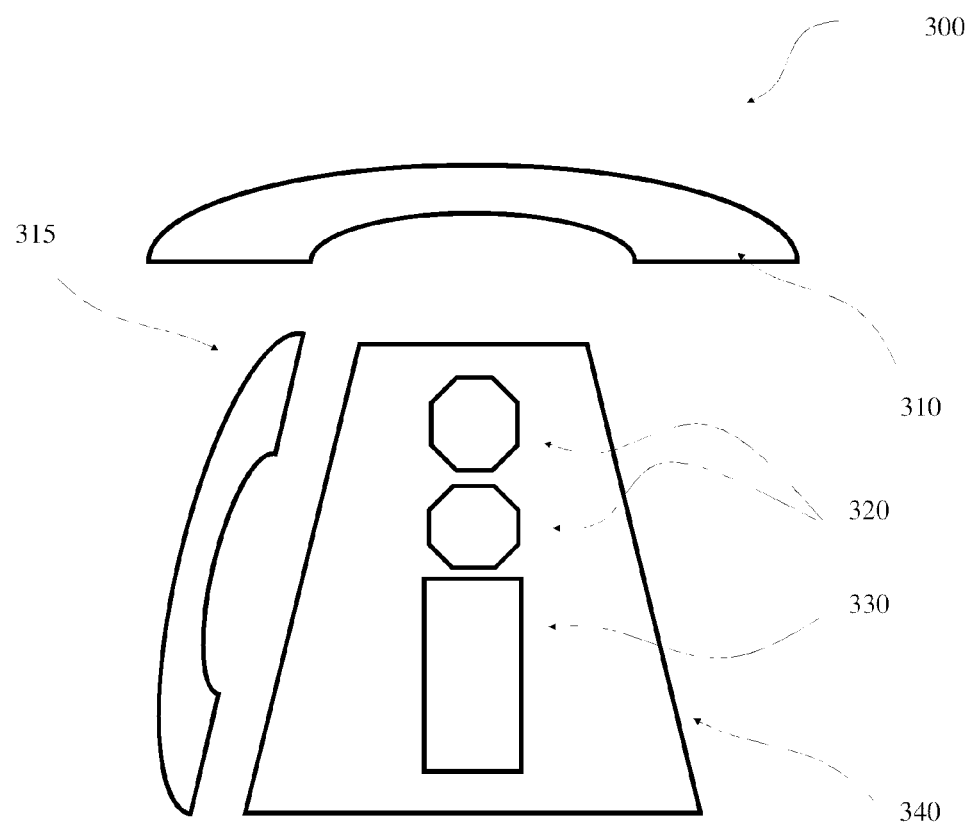
FIG. 3 depicts visible identifiers shown as shapes around or in the proximity of a vehicle, and which are generated by an apparatus according to an embodiment of the present invention.

FIG. 3 shows a conceptual illustration of a vehicle having associated therewith an apparatus in accordance with an embodiment wherein visible identifiers are at pre-determined positions in pre-determined geometries. FIG. 3 shows a representation of an apparatus in accordance with one embodiment mounted on a vehicle 340 (which may be a bicycle, car, motorcycle, person, animal, or other vehicle) comprising the use of polygonal scanners 320 to direct beams of visible radiation from a source of visible radiation 330 such that they create a highly visible reflection covering an area in front of the vehicle 310 and to the side of the vehicle 315. This configuration of visible identifiers can ensure that the vehicle 340 is both visible to other vehicles sharing the same surface, but also provides an increased periphery for other vehicles to move around, thereby increasing the space between the vehicle 340 in question and others.

This embodiment of the apparatus uses a visible radiation source that comprises a number of components including green lasers, energy generator from a battery, casing, a polygonal scanner 330 and a levelling switch. The components can be configured to operate according to the following specifications:

Green Laser:
    Class IIIb,
    wavelength—532 nm,
    output—>30 mw,
    beam divergence→1.2 mRad
    Operating voltage—3VDC max
    Average current 480 mA
    Mode—Constant Wave
DCVolt input:
    Li-Ion Cell 3DCV
    Voltage regulator
    PCB Li-ion/Li-polymer Battery Protection
    OR
    12DCVolt input from motorcycle
Casing:
    Epoxy
    Mounting bracket
Leveling Switch While this embodiment of the apparatus uses two polygonal scanners to create two visible regions on the surface proximal to the vehicle, a worker skilled in the art would understand that a plurality of visible identifiers could be created with one polygonal scanner, and also that other visible radiation sources could be used in combination with the polygonal scanner.

Example 2

Multiple Visible Radiation Sources

Figure 4:
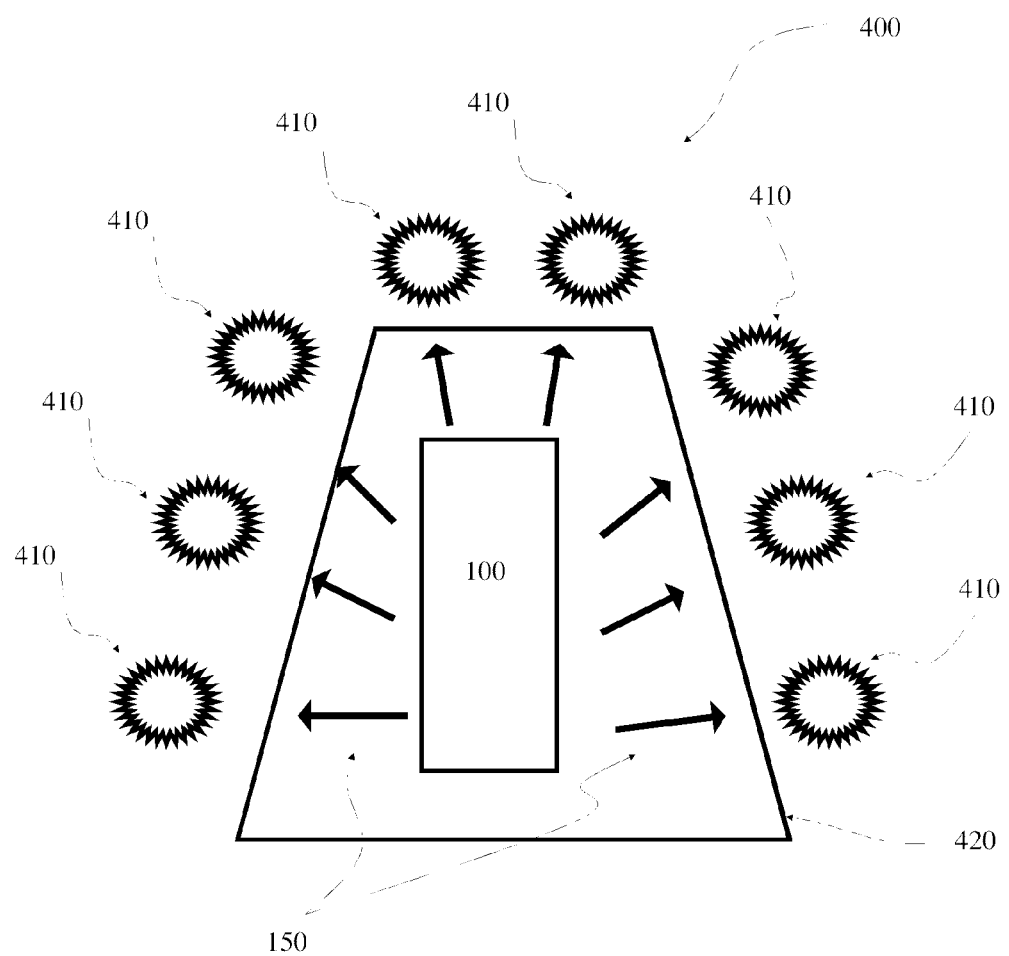
FIG. 4 depicts visible identifiers shown as shapes around or in the proximity of a vehicle, and which are generated by an apparatus according to an embodiment of the present invention.

FIG. 4 provides an additional conceptual illustration of a vehicle having mounted thereon an embodiment of the apparatus with visible identifiers directed to pre-determined positions in pre-determined geometries. The apparatus comprises a plurality of lasers 100 directing beams of radiation 150 towards the surface proximal to the vehicle 420. The visible identifiers 410 in this example could be representative of either point reflections on the surface of travel or laser-induced breakdown of air above said surface. The vehicle 420 may be representative of a bicycle, car, motorcycle, person, animal, or other vehicle.

This embodiment uses radiation sources 100 that comprises a number of components, including green lasers, energy generator from a battery, casing and a levelling switch. The components can be configured to operate according to the following specifications:

Green Laser:
    Class IIIb,
    wavelength—532 nm,
    output—>30 mw,
    beam divergence—1.2 mRad
    Operating voltage—3VDC max
    Average current 480 mA
    Mode—Constant Wave
DCVolt input:
    Li-Ion Cell 3DCV
    Voltage regulator
    PCB Li-ion/Li-polymer Battery Protection
    OR
    12DCVolt input from motorcycle
Casing:
    Epoxy
    Mounting bracket
Leveling Switch Example 3

Laser-Induced Breakdown of Air

Figure 5:
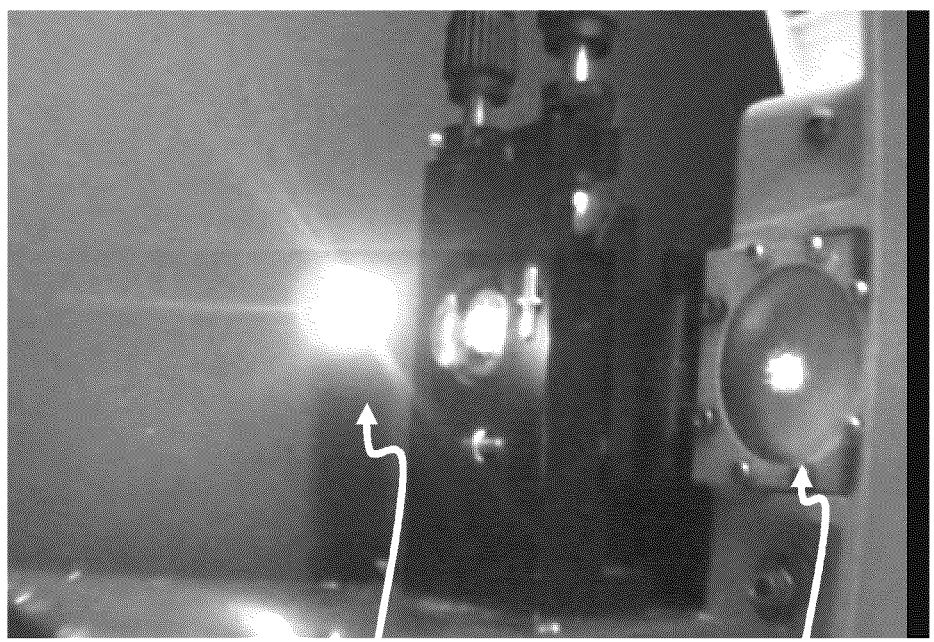
FIG. 5 depicts a laser-induced breakdown of air and a means therefor.

FIG. 5 shows an exemplary apparatus for inducing the breakdown of air 500 using a laser. The beam of radiation is not within the visible spectrum of light. The breakdown of air 510 is occurring at a pre-determined position. One or more radiation sources, such as the one in FIG. 5, can be used in embodiments of the apparatus, methods and uses disclosed herein in order to create a visible identifier at one or more pre-determined position proximate to a vehicle.

Example 4

Laser Projecting Point

Figure 6:
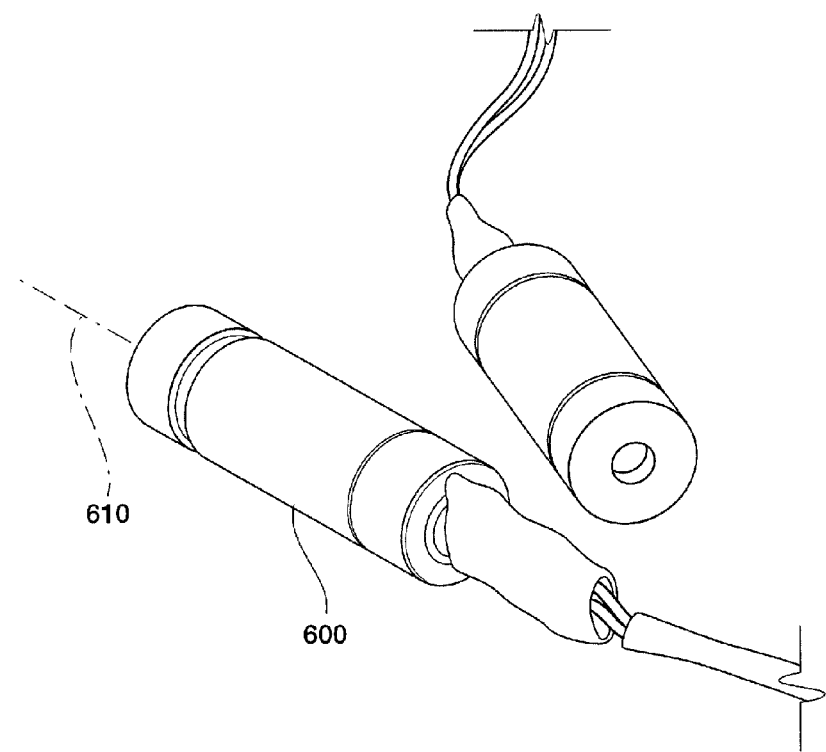
FIG. 6 depicts an embodiment of a radiation source for directing radiation to one or more pre-determined positions to form a visible identifier as a point in accordance with an embodiment of the present invention.

FIG. 6 shows an exemplary radiation source 600. In this case, the radiation source 600 is a green laser with a beam of visible radiation 610 for creating a reflection point which can be the visible identifier. Said beam 610 can be used to create other shapes or geometries when used in combination with other elements discussed in the instant application, such as beam splitter, beam reflector, scanner, or other optical element or process control element.

Example 5

Laser Projecting a Line

Figure 7:
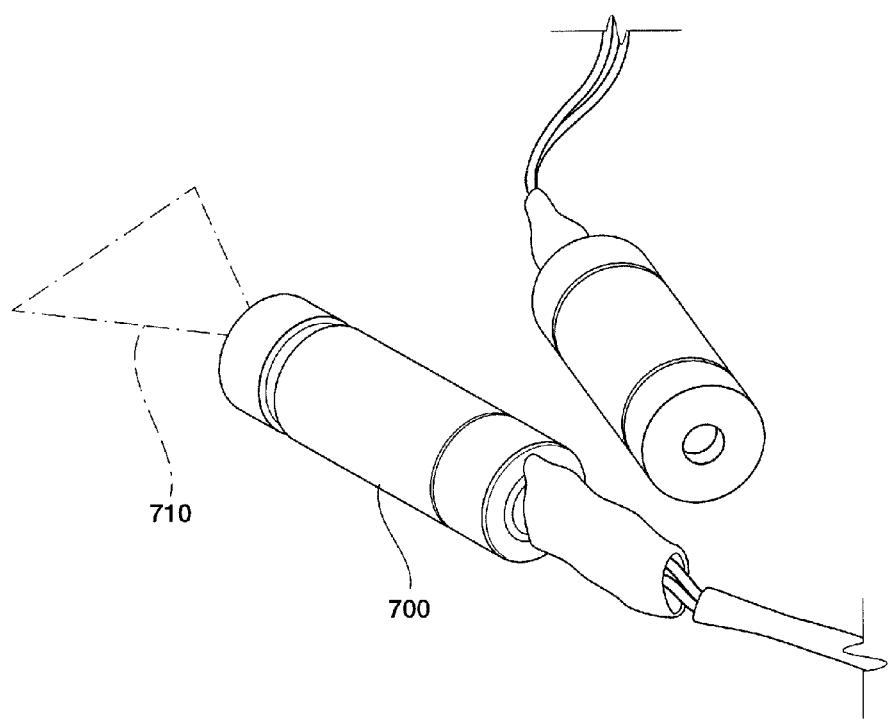
FIG. 7 depicts another embodiment of a radiation source for directing radiation to one or more pre-determined positions to form a visible identifier as a line in accordance with an embodiment of the present invention.

FIG. 7 shows an exemplary radiation source 700. In this case, the radiation source 700 is a green laser with a beam of visible radiation 710 that is emitted in a planar configuration and may be used for creating a linear visible identifier. Said beam 710 can be used to create other shapes or geometries when used in combination with other elements discussed in the instant application, such as beam splitter, beam reflector, scanner, or other optical element or process control element.

Example 6

Spider Legs

Figure 9:
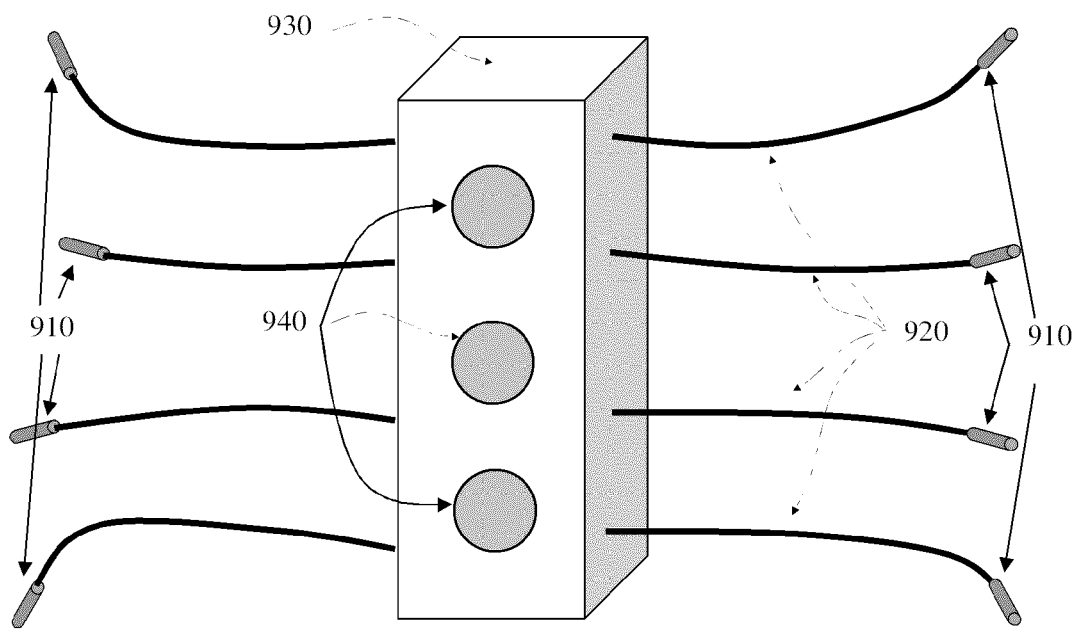
FIG. 9 depicts a device for defining a safety zone for a vehicle in accordance with an embodiment of the present invention.

FIG. 9 shows an exemplary embodiment of an apparatus for defining a safety zone, comprising one or more radiation sources 910, 940 that may be operatively coupled to a vehicle via a casing or coupling element 930, the one or more radiation sources 910, 940 configured to create one or more visible identifiers in one or more pre-determined positions, wherein in this example the location of the visible identifiers is substantially the same as that of one or more radiation sources 910, 940. In this exemplary embodiment, a number of the radiation sources 910 are located at a proximal end of semi-rigid extenders 920 that may be fixably and/or bendably and/ or extendably configured into an orientation that is fixed relative to the coupling element or casing, and thus the vehicle to which the coupling element or casing is secured.

The embodiment of FIG. 9 makes use of LED technology located on fixably configurable extensions, which in some embodiments can resemble a spider with legs. The coupling element or casing 930 comprises energy sources (not shown) and attachment base (not shown) for the one or more extenders 920. Each end of the extenders 920 has a bright 360 degree LED light as a radiation source and/or visible identifier 910. The one or more extenders 920 are approximately one to two feet long, but can be substantially any length depending on and appropriate for the application, vehicle type, visibility conditions, atmospheric or prevailing conditions, as would be understood by a person skilled in the art.

Figure 10:
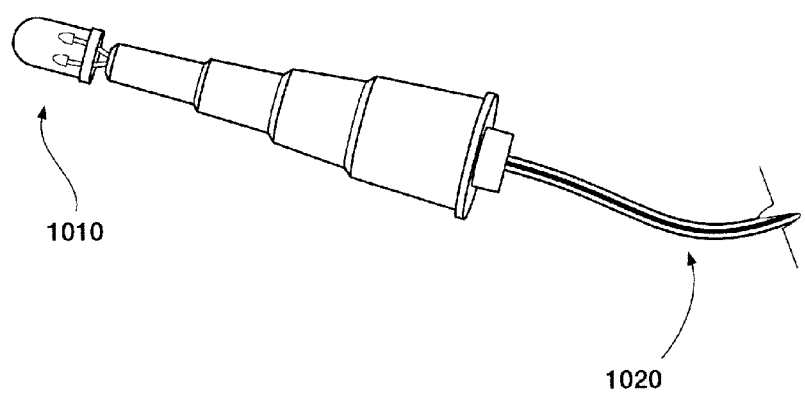
FIG. 10 depicts an embodiment of a radiation source for directing radiation to one or more pre-determined positions to form a visible identifier as a point in accordance with an embodiment of the present invention.

FIG. 10 depicts an embodiment of a radiation source and/or a visible identifiers 1010 located on the proximal end of an extender 1020. The visible identifier 1010 in this example comprises an LED radiation source encased in a coloured transparent medium. In this example, the coloured medium filters some emitted visible radiation thus permitting light that is most easily seen and/or noticeable in a broad range of conditions. The radiation source, or elements thereof, such as the coloured medium, may be replaced with different types of radiation sources. The different types of radiation sources may be the visible identifiers 1010, or they may direct radiation to create a visible identifier at a different pre-determined position. The extender 1020 is of low weight and configured to carry an electric current and be fixed in a particular position to enable the radiation source and/or visible identifier 1010 to be located at a pre-determined position or directed in a pre-determined direction.

The extenders 1020 of FIG. 10 are made of semi-rigid plastic tubes that are bendable up to a 90 degree angle. The plastic tubes are of light weight with the ability to support an electronic current to illuminate the radiation source and/or visible identifier 1010, which is an LED light placed at the end of the extender 1020. The purpose of a flexible semi rigid tube is to provide the ability to configure the extender 1020 to be moveably and fixably manipulated into a fixed position relative to the coupling element or casing, and to be able to direct the radiation source in a wide variety of directions from a vehicle, person, or animal to the one or more pre-determined positions defining a safety zone. Substantially rigid extenders can ensure that a radiation source can remain in a desired position. The radiation source shown in FIG. 10 is a red coloured LED light, but a radiation source having light of substantially any colour, brightness, coherency, or other characteristic known in the art would be appropriate depending on the application, vehicle type, visibility conditions, atmospheric or prevailing conditions, as would be understood by a person skilled in the art.

I claim:

1. An apparatus for defining a safety zone for a vehicle, the apparatus comprising:
   one or more radiation sources operatively coupled to the vehicle, and a leveling device configured to prevent operation of the one or more radiation sources when the apparatus is inclined beyond a pre-determined angle the one or more radiation sources configured to create one or more visible identifiers at one or more locations, said locations defining a pre-determined position relative to the vehicle, and said one or more visible identifiers thereby defining the safety zone for the vehicle.

2. The apparatus of claim 1, wherein at least one of the one or more radiation sources is a laser.

3. The apparatus of claim 1, wherein the vehicle is a person, animal, bicycle, motorcycle, car, truck, stroller, trailer, sidecar, or cart.

4. The apparatus of claim 1, wherein one or more of the visible identifiers are defined by a geometry defined by a point, straight or curved line, area, space, one-dimensional shape, two-dimensional shape or three-dimensional shape.

5. The apparatus of claim 1, wherein one or more of the visible identifiers is the radiation source.

6. The apparatus of claim 1, wherein one or more of the visible identifiers is a reflection of the radiation on a surface proximal to the vehicle.

7. The apparatus of claim 1, wherein the one or more visible identifiers is a diffusion or reflection of the radiation on a medium proximal to the vehicle or radiation source.

8. The apparatus of claim 7, wherein one or more of the radiation sources is adjacent to the medium.

9. The apparatus of claim 1, wherein one or more of the visible identifiers is a laser-induced breakdown of air.

10. The apparatus of claim 1, wherein one or more of the radiation sources is operatively coupled to a proximal portion of an extender, wherein a second portion of the extender is operatively coupled to the vehicle.

11. The apparatus of claim 10, wherein the one or more extenders are configured to be adjustably fixable in a pre-determined configuration.

12. The apparatus of claim 1, wherein the apparatus further comprises a control module, the control module configured to adjust one or more of the pre-determined positions defining the safety zone, one or more characteristics of the emitted radiation, one or more characteristics of the one or more visible identifiers, or any combination thereof.

13. The apparatus of claim 12, wherein the control module effects adjustments according to:
   instructions stored on a computer-readable medium contained in the control module;
   instructions provided by the operator of the vehicle;
   changes in ambient conditions;
   instructions received by the control module from a communications network; or any combination thereof.

14. A method for creating a safety zone proximal to a vehicle, comprising the steps:
   mounting, on the vehicle, an apparatus comprising one or more radiation sources and a leveling device configured to prevent operation of the one or more radiation sources when the apparatus is inclined beyond a pre-determined angle;
   directing said one or more radiation sources towards one or more pre-determined positions proximal to the vehicle; and
   operating the one or more radiation sources to create one or more visible identifiers at the one or more pre-determined positions to define a safety zone for the vehicle.

15. The method of claim 14, wherein the step of directing said one or more radiation sources towards one or more pre-determined positions proximal to the vehicle, comprises manipulating an adjustably fixable extender into a pre-determined configuration.

16. The method of claim 14, wherein one or more of the visible identifiers is the radiation source.

17. The method of claim 14, wherein one or more of the visible identifiers is a reflection of the radiation on a surface proximal to the vehicle.

18. The method of claim 14, wherein one or more of the visible identifiers is a diffusion or reflection of the radiation on a medium proximal to the vehicle or radiation source.

19. The method of claim 14, wherein one or more of the visible identifiers is adjacent to the one or more radiation sources.

20. The method of claim 14, wherein one or more of the visible identifiers is a laser-induced breakdown of air.

21. The method of claim 14, wherein the step of operating the one or more radiation sources further comprises adjusting the one or more pre-determined positions defining the safety zone, one or more characteristics of the emitted radiation, one or more characteristics of the one or more visible identifiers, or any combination thereof according to instructions from a control module.

22. The method of claim 21, wherein the instructions from the control module are configured to make adjustments according to:
   instructions stored on a computer readable medium contained in the control module;
   instructions provided by the operator of the vehicle;
   changes in ambient conditions;
   according to instructions received by the control module from a communications network; or
   any combination thereof.

* * * * *